United States Patent
Hwang et al.

(10) Patent No.: US 8,259,864 B2
(45) Date of Patent: Sep. 4, 2012

(54) METHODS AND SYSTEMS FOR FOURIER-QUADRATIC BASIS CHANNEL ESTIMATION IN OFDMA SYSTEMS

(75) Inventors: Sungjun Hwang, Columbus, OH (US); Madihally J. Narasimha, Saratogo, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 12/367,499

(22) Filed: Feb. 6, 2009

(65) Prior Publication Data

US 2010/0203841 A1    Aug. 12, 2010

(51) Int. Cl.
*H04L 27/06* (2006.01)
(52) U.S. Cl. ............ 375/340; 455/67.14; 375/267
(58) Field of Classification Search .......... 370/437; 375/229, 260, 267, 344; 455/67.14, 334
See application file for complete search history.

(56) References Cited

U.S. PATENT DOCUMENTS

| | | | |
|---|---|---|---|
| 2008/0008258 A1* | 1/2008 | Tanabe | 375/267 |
| 2008/0240311 A1* | 10/2008 | Piirainen et al. | 375/344 |
| 2009/0202005 A1* | 8/2009 | Cairns | 375/260 |
| 2010/0009649 A1* | 1/2010 | Huebner et al. | 455/334 |

OTHER PUBLICATIONS

Hu, Chia-Chang et al.: "Adjustable Comb-Type Pilot Arrangement in Wireless OFDM," XP031352414, IEEE 68th Vehicular Technology Conference, 2008: (Sep. 21, 2008), pp. 1-4, doi: 10.1109/VETECF. 2008.231.
International Search Report and Written Opinion—PCT/US2010/023338, International Search Authority—European Patent Office Jul. 26, 2010.
Ozdemir, Mehmet Kemal et al.: "Channel Estimation for Wireless OFDM Systems," XP011186984, IEEE Communications Surveys & Tutorials, ISSN: 1553-877X, 2nd Quarter 2007, 9(2), p. 18-48.

\* cited by examiner

*Primary Examiner* — Leon-Viet Nguyen
(74) *Attorney, Agent, or Firm* — Charles Chesney

(57) ABSTRACT

Certain embodiments of the present disclosure relate to a Fourier-Quadratic (FQ) method for channel estimation that may help improve error rate performance of existing techniques, with only moderate increase in computational complexity. The proposed FQ scheme according to certain embodiments may provide a viable solution to the difficult channel estimation problem encountered in the Vehicular B channel with a long delay spread. Furthermore, a robustness of the proposed FQ channel estimation scheme to accommodate errors in a channel delay profile and to errors in a channel power profile is demonstrated through simulations.

36 Claims, 16 Drawing Sheets

|  | Algorithm I | Algorithm II | Auto-K Quad |
|---|---|---|---|
| Precalculation once in every frame | $(72N_a^2 + 12N_a)K$ | $(54N_a^2 + 12N_a)K$ | $2N_kN_r(N_k+N_r)+ \frac{4}{3}N_r^2 - 2N_r^2 + \frac{4}{3}N_r$ |
| Estimation of $\theta$ | $6N_aK$ | $(12N_a+2)K$ | $12K + N_k^2$ |
| Channel reconstruction | $42KN_a$ | $42KN_a$ | $14KN_k$ |
| Storage (samples) | $6N_aK$ | $(18N_a^2 + 12N_a + 2)K$ | $12K + N_k^2$ |
| Precalculation for Scenario I | 26,640 | 20,160 | 320 |
| $\theta$ for Scenario I | 360 | 740 | 156 |
| Channel reconstruction for Scenario I | 2,520 | 2,520 | 840 |
| Storage for Scenario I (samples) | 360 | 7,220 | 156 |
| Total of one frame (min) for Scenario I | 130,320 | 137,520 | 36,176 |
| Total of one frame (max) for Scenario I | 545,040 | 606,960 | 179,600 |

FIG. 5

METHODS AND SYSTEMS FOR FOURIER-QUADRATIC BASIS CHANNEL ESTIMATION IN OFDMA SYSTEMS

TECHNICAL FIELD

Certain embodiments of the present disclosure generally relate to a wireless communication and, more particularly, to a method to improve accuracy of channel estimation.

SUMMARY

Certain embodiments of the present disclosure provide a method for a wireless communications. The method generally includes estimating a two-dimensional channel response at pilot locations on a time-frequency grid, generating an observation matrix for a plurality of symbols by using a Fourier basis, computing channel parameters that model time variations of the channel response with a quadratic polynomial function using the observation matrix and the channel response, and reconstructing the channel response on the time-frequency grid at non-pilot locations using the computed channel parameters and the Fourier basis.

Certain embodiments of the present disclosure provide an apparatus for a wireless communications. The apparatus generally includes logic for estimating a two-dimensional channel response at pilot locations on a time-frequency grid, logic for generating an observation matrix for a plurality of symbols by using a Fourier basis, logic for computing channel parameters that model time variations of the channel response with a quadratic polynomial function using the observation matrix and the channel response, and logic for reconstructing the channel response on the time-frequency grid at non-pilot locations using the computed channel parameters and the Fourier basis.

Certain embodiments of the present disclosure provide an apparatus for a wireless communications. The apparatus generally includes means for estimating a two-dimensional channel response at pilot locations on a time-frequency grid, means for generating an observation matrix for a plurality of symbols by using a Fourier basis, means for computing channel parameters that model time variations of the channel response with a quadratic polynomial function using the observation matrix and the channel response, and means for reconstructing the channel response on the time-frequency grid at non-pilot locations using the computed channel parameters and the Fourier basis.

Certain embodiments of the present disclosure provide a computer-program product for a wireless communications, comprising a computer readable medium having instructions stored thereon, the instructions being executable by one or more processors. The instructions generally include instructions for estimating a two-dimensional channel response at pilot locations on a time-frequency grid, instructions for generating an observation matrix for a plurality of symbols by using a Fourier basis, instructions for computing channel parameters that model time variations of the channel response with a quadratic polynomial function using the observation matrix and the channel response, and instructions for reconstructing the channel response on the time-frequency grid at non-pilot locations using the computed channel parameters and the Fourier basis.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 5 illustrates a complexity comparison in terms of a number of complex multiplications for different channel estimation algorithms in accordance with certain embodiments of the present disclosure.

DETAILED DESCRIPTION

Figure 1:
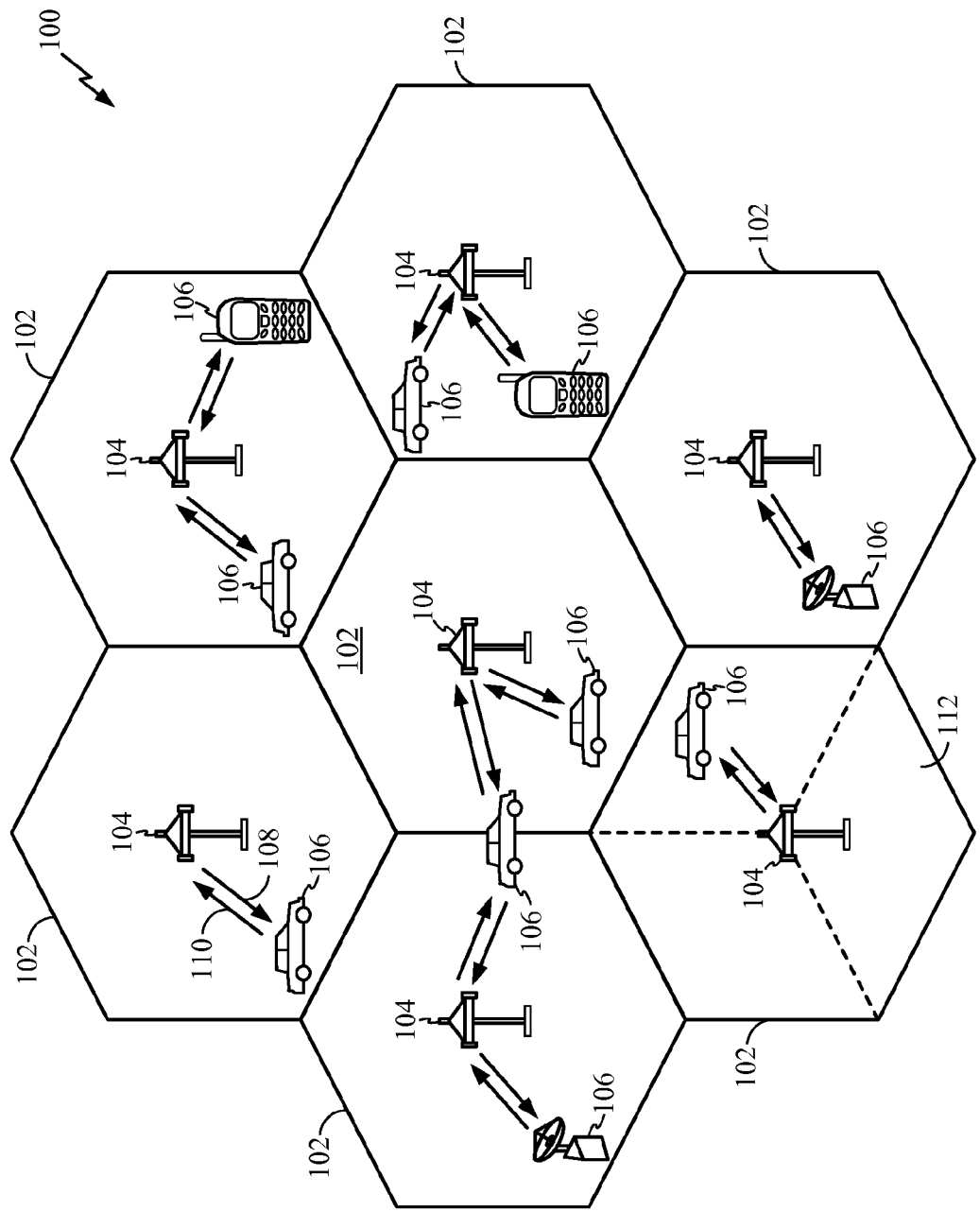
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Estimation of a time-varying channel in a single-input single-output (SISO) Orthogonal Frequency Division Multiple Access (OFDMA) system presents various challenges. For example, one particular challenge is to accurately estimate an impulse response of a fast-fading channel whose delay spread can be very long, longer than the length of a cyclic prefix (CP). One example of such channel environment is the International Telecommunications Union (ITU) Vehicular B channel. For an exemplary case of 1024 subcarriers, the channel delay spread can be greater than 20 μsec, which exceeds the CP length of 11.4 μsec.

A frequency response of a channel with long delay spread is typically characterized by fast variations of a channel phase. Existing channel estimation techniques that utilize quadratic functions to model phase variations achieve poor error rate performance because these algorithms are not able to accurately model rapidly rotating variations of the channel phase.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
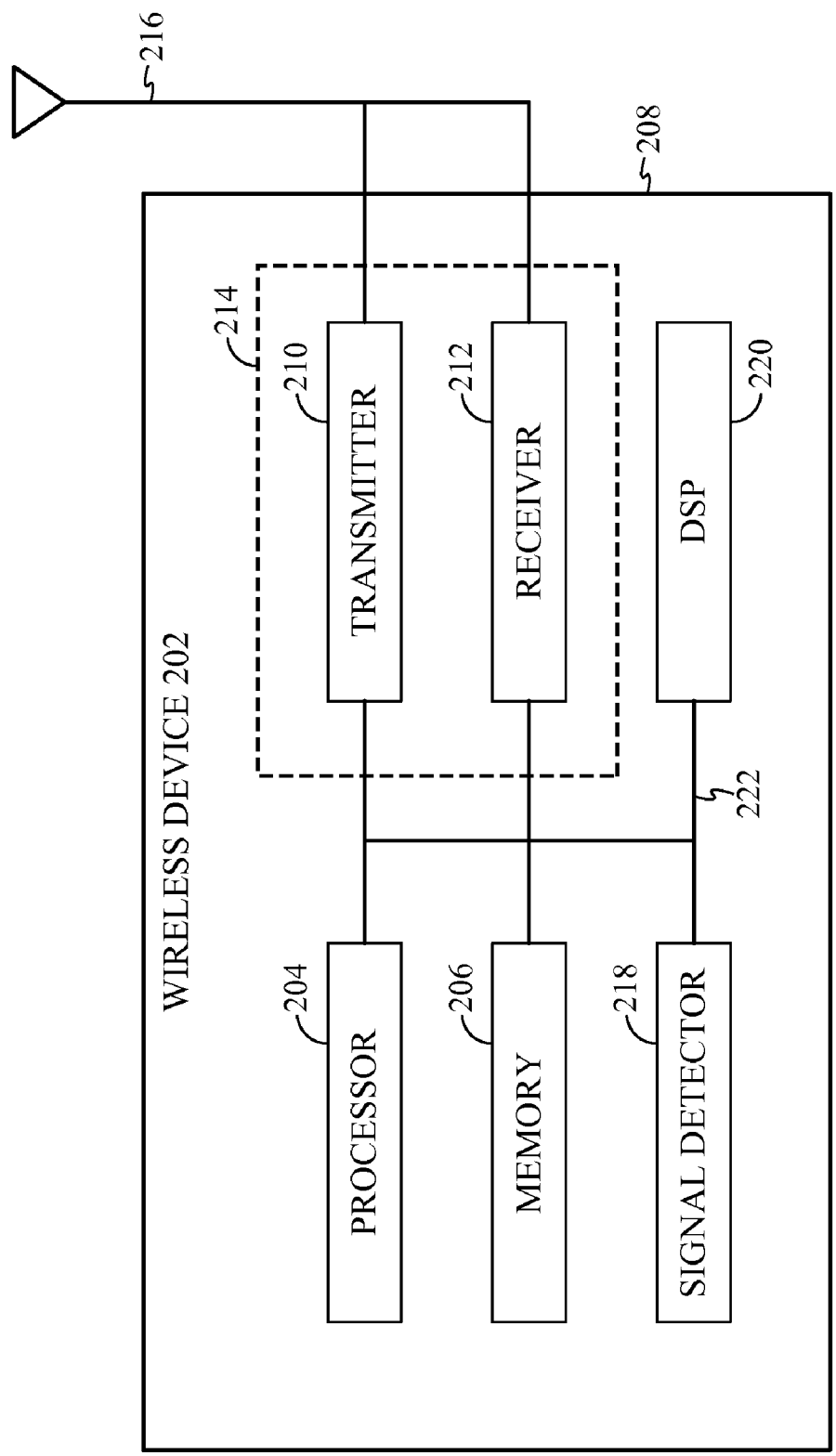
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The various components of the wireless device 202 may be coupled together by a bus system 222, which may include a power bus, a control signal bus, and a status signal bus in addition to a data bus.

Figure 3:
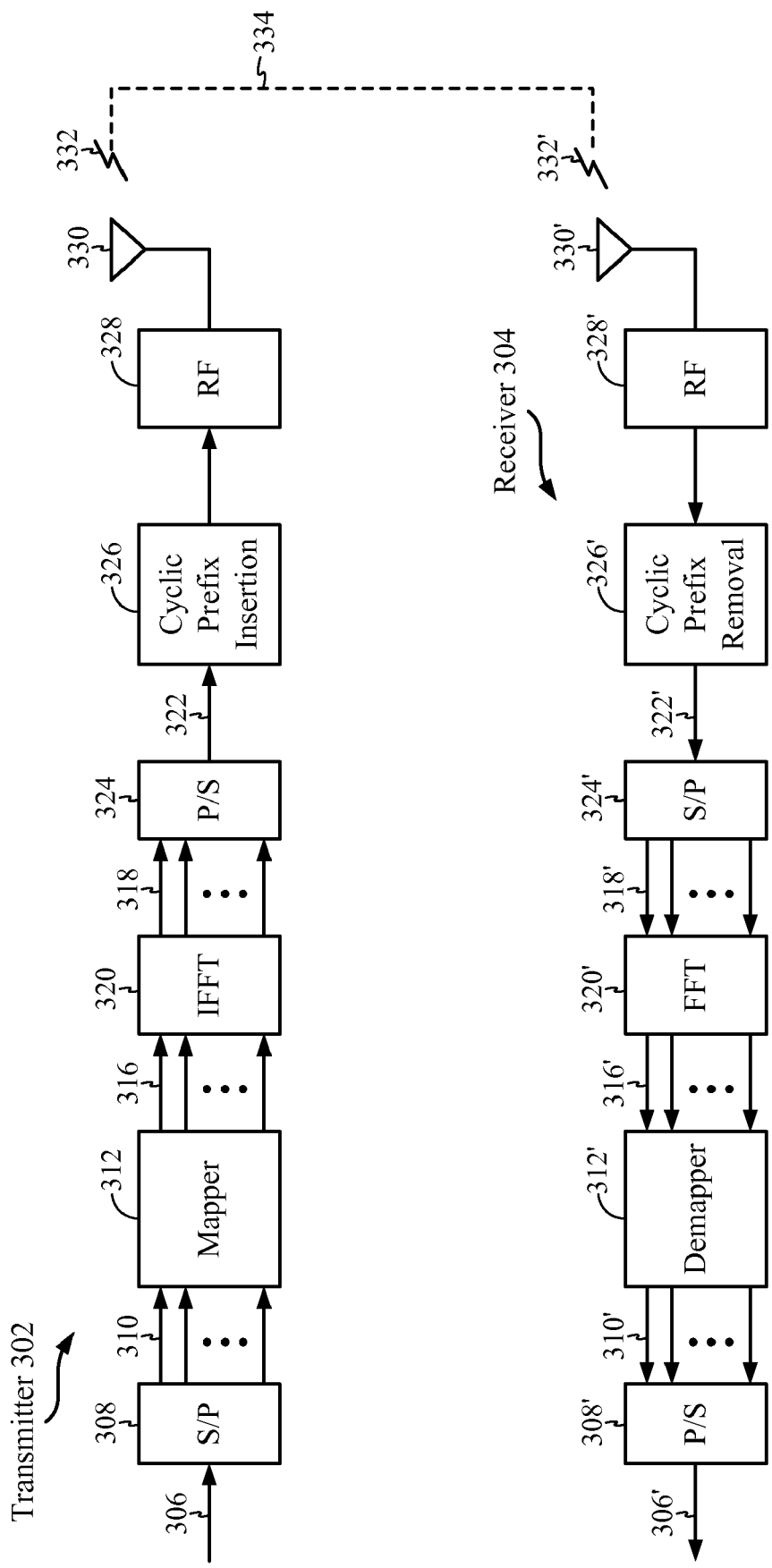
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110. Data 306 to be transmitted is shown being provided as input to a serial-to-parallel (S/P) converter 308. The S/P converter 308 may split the transmission data into M parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, NS, is equal to NCP (the number of cyclic prefix (CP) samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A cyclic prefix insertion component 326 may insert a CP between successive OFDM/OFDMA symbols in the OFDM/OFDMA symbol stream 322. The output of the CP insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A CP removal component 326' may then remove the CP that was inserted between OFDM/OFDMA symbols by the CP insertion component 326.

The output of the CP removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Fourier-Quadratic Channel Estimation

Certain embodiments of the present disclosure provide channel estimation techniques suitable for independent cluster processing in OFDMA systems with a long channel delay spread is described in the present disclosure. A certain proposed technique, referred to herein as a Fourier-Quad (FQ) scheme, assumes that an approximate channel delay profile can be available at the beginning of OFDMA frame, which may be obtained from a preamble signal. Based on the known channel response at pilot locations of a time-frequency grid, the FQ scheme may employ a Fourier basis in a frequency dimension, and a quadratic polynomial function in a time dimension. Then, the least squares (LS) solution may be applied to estimate the channel response in the entire time-frequency grid.

Simulation results presented herein indicate that the FQ scheme may have superior error rate performance compare to the existing techniques, especially for channels with long delay spreads, such as the ITU Vehicular B channel, and performs as good or better in case of channels with shorter delay spreads. Certain embodiments of the present disclosure support a recursive version of the FQ scheme for a reduction of computational complexity. Analysis of computational requirements shows that the FQ technique may have only moderate increase of computational complexity than methods from the prior art. The proposed FQ scheme may also be robust and accommodate inaccuracies in the estimated channel delay profile.

Exemplary Introduction of Fourier-Quadratic Channel Estimation

The proposed Fourier-Quadratic (FQ) channel estimation scheme follows the same paradigm as the well-known "Quad-all" algorithm that utilizes a quadratic polynomial function to model channel variations in both time and frequency dimensions; i.e., deterministic channel modeling and least-squares (LS) estimation. However, motivated by the fact that the quadratic polynomial function is not appropriate fit to model the rapidly rotating channel on the frequency dimension, it is proposed in the present disclosure to replace the quadratic polynomial function with the Fourier basis.

Frequency domain channel response may be represented by a product of the Fourier basis matrix and the time domain channel response, which is equivalent to a sum of the weighted Fourier basis. Therefore, the Fourier basis may be adopted for modeling the channel frequency response.

The proposed FQ scheme may be capable of precisely representing phase rotations of the channel response, thereby allowing for more accurate modeling of long-delay channels. Furthermore, since only a few channel taps may typically have non-zero values, it may be possible to leverage this sparsity of the channel response for obtaining a computationally efficient channel estimation algorithm. Therefore, among Fourier basis vectors that correspond to the length of CP, only those vectors that represent active tap locations may be selected. This may reduce a dimensionality of the LS problem, but requires estimation of the channel delay profile. For certain embodiments of the present disclosure, the channel delay profile can be approximately computed at the start of the frame from the known preamble symbol.

For certain embodiments of the present disclosure the estimation accuracy may be significantly improved by applying weights to the Fourier basis. The optimum weighting function may correspond to a channel power profile. Since the channel power profile is generally not available, alternative weighting schemes are proposed in the present disclosure that perform close to the optimum weighting scheme. Simulation results are provided for two such weighting schemes: an exponential weighting and a weighting based on estimated channel power profile from the preamble. Furthermore, the effect of inaccurately estimated channel delay profile on error rate performance of the proposed FQ scheme is investigated, and it can be demonstrated that the FQ scheme may be very robust to small perturbations of tap locations.

Exemplary Channel Model

It can be assumed that locations of channel delay taps are known, and a total number of active (non-zero) channel taps may be equal to $N_a$. A set of active channel tap locations can be written as:

$$L := \{l_0, \ldots, l_{N_a-1}\}. \tag{1}$$

Also, it can be assumed that the tap locations may be invariant for the duration of estimation block, which can be, for example, K=10 OFDMA symbols.

For certain embodiments of the present disclosure, under certain conditions, the channel response may be assumed to be constant over duration of one OFDMA symbol. This assumed constant channel response may correspond to the time-average of channel tap realizations over the particular symbol duration. This is also equivalent to utilizing only the main diagonal of the frequency domain channel matrix, which may not be diagonal for time-varying channels.

The time-averaged impulse responses of active channel taps at the ith symbol may be collected as $g^{(i)} \in C^{N_a}$, i.e., $$g^{(i)} := \left[g_{l_0}^{(i)}, \ldots, g_{l_{N_a-1}}^{(i)}\right]^T. \tag{2}$$

The time variation of each channel tap may be modeled with a quadratic polynomial function:

$$g_l^{(i)} = \alpha_l i^2 + \beta_l i + \gamma_l, \text{ for } l \in L. \tag{3}$$

Then, the impulse response vector $g^{(i)}$ can be rewritten as:

$$g^{(i)} = \alpha i^2 + \beta i + \gamma, \tag{4}$$

where $\alpha, \beta, \gamma \in C^{N_a}$ may be defined as:

$$\alpha := \left[\alpha_{l_0}, \ldots, \alpha_{l_{N_a-1}}\right]^T, \tag{5}$$

$$\beta := \left[\beta_{l_0}, \ldots, \beta_{l_{N_a-1}}\right]^T, \tag{6}$$

$$\gamma := \left[\gamma_{l_0}, \ldots, \gamma_{l_{N_a-1}}\right]^T. \tag{7}$$

As a simple illustration, without loss of generality, the frequency channel response for one particular cluster can be considered. In standard OFDMA systems, pilots may be sent along with data in a cluster to facilitate channel estimation. For example, in the WiMAX downlink Partially Used Sub-Carrier (PUSC) mode, a cluster comprises of 14 adjacent frequency subcarriers over two OFDMA symbols, consisting of 12 data tones and 2 pilot tones in each of the OFDMA symbols, which yields a total of 24 data tones and 4 pilot tones per cluster. It can be also assumed that the cluster may start from the subcarrier index 0, and the number of subcarriers in the cluster may be equal to $N_C$ ($N_C$=14 for the exemplary case cited above). Then, the frequency-domain channel response within the specified cluster may be expressed as:

$$h^{(i)} = F_C \cdot g^{(i)} \tag{8}$$

$$= F_C \cdot (\alpha i^2 + \beta i + \gamma) \tag{9}$$

$$= [i^2 F_C, i F_C, F_C] \cdot \begin{bmatrix} \alpha \\ \beta \\ \gamma \end{bmatrix} \tag{10}$$

$$= [i^2 F_C, i F_C, F_C] \cdot \theta, \tag{11}$$

where $F_C \in C^{N_C \times N_a}$ and $\theta \in C^{3N_a}$ may be defined as:

$$F_C := F(0 : N_C - 1, L) \tag{12}$$

$$= \frac{1}{N} \begin{bmatrix} e^{-j\frac{2\pi}{N} \cdot 0 \cdot l_0} & \cdots & e^{-j\frac{2\pi}{N} \cdot 0 \cdot l_{N_a-1}} \\ \vdots & \ddots & \vdots \\ e^{-j\frac{2\pi}{N} \cdot (N_C-1) \cdot l_0} & \cdots & e^{-j\frac{2\pi}{N} \cdot (N_C-1) \cdot l_{N_a-1}} \end{bmatrix}, \tag{13}$$

$$\theta := \begin{bmatrix} \alpha \\ \beta \\ \gamma \end{bmatrix}, \tag{14}$$

where F is the N-point Discrete Fourier Transform (DFT) matrix and N is the size of the corresponding Fast Fourier Transform (FFT).

Exemplary Derivation of Fourier-Quadratic Channel Estimation Algorithm

Figure 4:
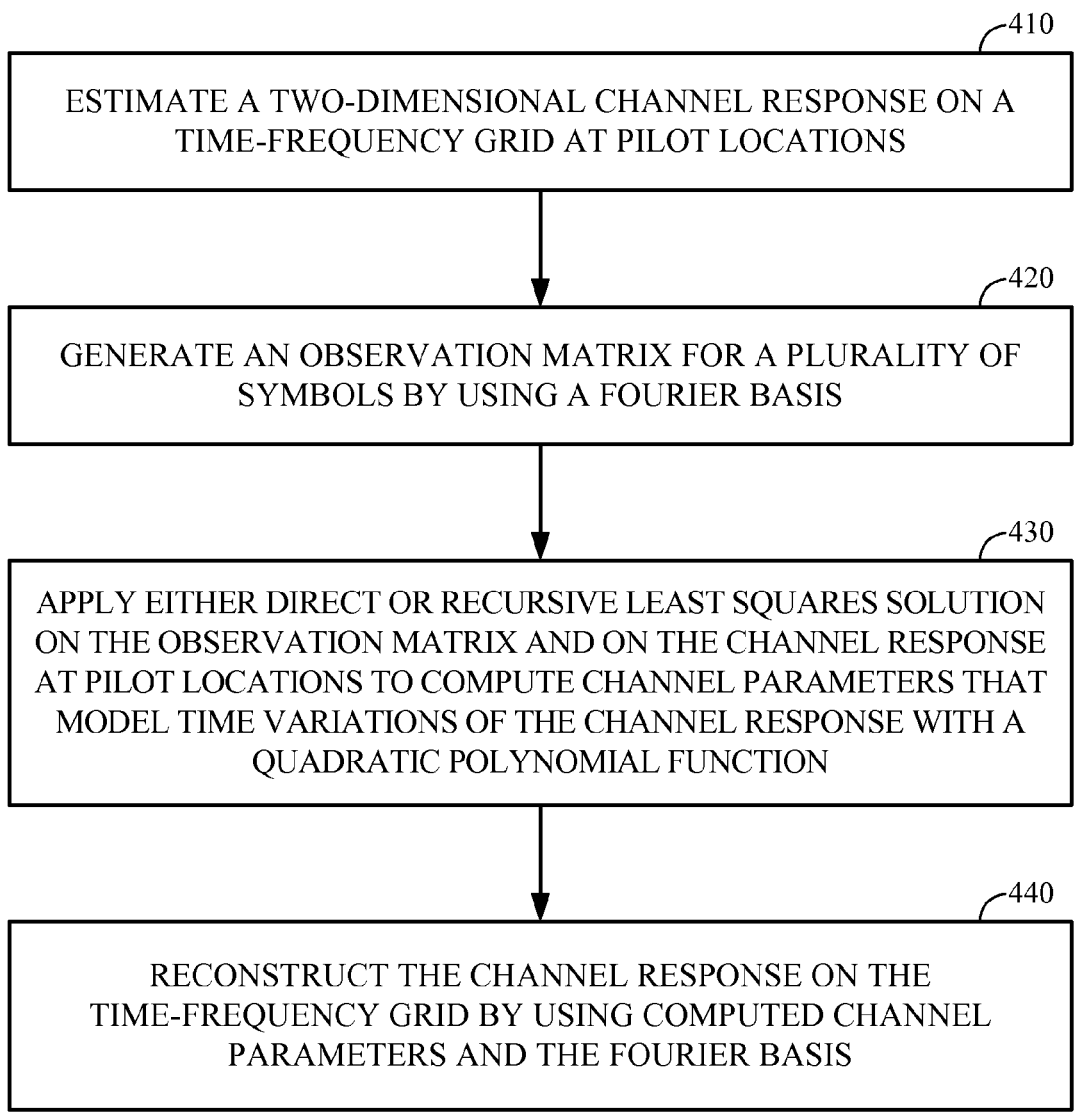
FIG. 4 illustrates a process of channel estimation using a Fourier-quadratic basis in accordance with certain embodiments of the present disclosure.

FIG. 4 illustrates operations 400 for channel estimation using a combined Fourier-quadratic basis. At 410, a two-dimensional channel response on a time-frequency grid may be estimated at pilot locations. At 420, an observation matrix may be generated for a plurality of symbols by using a Fourier basis. At 430, either direct or recursive least squares (LS) solution may be applied on the generated observation matrix and on the channel response at pilot locations in order to compute channel parameters from equations (4)-(7) that model time variations of the channel response with a quadratic polynomial function. The channel response on the entire time-frequency grid may be reconstructed, at 440, by using computed channel parameters and the Fourier basis. The proposed channel estimation algorithm that uses the combined Fourier-quadratic basis will be described in more details in the following text.

It can be assumed, without loss of generality, that there may be two pilot tones in each cluster. The frequency-domain channel response for these pilots, $h_p^{(i)} \in C^2$, may be written as:

$$h_p^{(i)} = F_p^{(i)} g^{(i)}, \tag{15}$$

where $$F_p^{(i)} := F(L_p^{(i)}, L), \tag{16}$$

and $L_p^{(i)}$ is a set of subchannel indices of pilots in the cluster for the ith symbol with $|L_p^{(i)}|=2$.

By stacking $h_p^{(i)}$ for K symbols, i.e. $i \in \{0, \ldots, K-1\}$, the following may be obtained:

$$h_p := \begin{bmatrix} h_p^{(0)} \\ \vdots \\ h_p^{(K-1)} \end{bmatrix} \quad (17)$$

$$= \begin{bmatrix} 0^2 \cdot F_p^{(0)} & 0 \cdot F_p^{(0)} & F_p^{(0)} \\ 1^2 \cdot F_p^{(1)} & 1 \cdot F_p^{(1)} & F_p^{(1)} \\ \vdots & \vdots & \vdots \\ (K-1)^2 \cdot F_p^{(K-1)} & (K-1) \cdot F_p^{(K-1)} & F_p^{(K-1)} \end{bmatrix} \cdot \theta \quad (18)$$

$$= A \cdot \theta, \quad (19)$$

where the observation matrix A is a $2K \times 3N_a$ complex matrix.

The least squares (LS) solution for a vector of channel parameters $\theta$ may be expressed as:

$$\hat{\theta} = A^+ \cdot h_p, \quad (20)$$

where $$A^+ := \begin{cases} (A^H A)^{-1} A^H, & \text{for } 2K \geq 3N_a \\ A^H (AA^H)^{-1}, & \text{otherwise.} \end{cases} \quad (21)$$

Once the estimates of channel parameters are obtained, the frequency response of the channel on the entire time-frequency grid may be reconstructed according to equation (11), i.e., $$h^{(i)} = [i^2 F_C, \, i F_C, \, F_C] \cdot \hat{\theta}. \quad (22)$$

This proposed channel estimation scheme can be referred as a Fourier-Quadratic (FQ) scheme because the two-dimensional channel response may be modeled by the Fourier basis in the frequency dimension and by the quadratic polynomial function in the time dimension. It should be also noted that the error rate performance of the proposed algorithm may be further enhanced by utilizing a turbo-type feedback of log-likelihood ratios (LLRs) of transmitted bits available after detection, and this is within the scope of the present disclosure The main computational burden of the proposed FQ channel estimation scheme may be in calculating the inverse matrix $(A^H A)^{-1}$. In order to speed up the matrix inversion process, a recursive technique may be proposed. First, for certain embodiments of the present disclosure, it can be assumed that $2K \geq 3N_a$, although it can be shown that the eventual solution may be applicable even if this particular condition is not satisfied. A sub-matrix $A_n \in C^{(n+1) \times 3N_a}$ of the observation matrix A from equation (18) may be represented in the row-incremental form, i.e.:

$$A_n := \begin{bmatrix} A_{n-1} \\ a_n^H \end{bmatrix}, \quad (23)$$

where $a_n^H$ is the nth row of the observation matrix. Thus, it may be true that $A_{2K-1} = A$ with $A_{-1} = 0$.

Likewise, channel response at pilot locations $h_{p,n}$ may be represented as:

$$h_{p,n} := \begin{bmatrix} h_{p,n-1} \\ h_{p,n} \end{bmatrix}, \quad (24)$$

where $h_{p,n}$ is the nth row of the channel response vector given by equation (17).

The inverse matrix from equation (20) may be rewritten as:

$$P_n := (A_n^H A_n)^{-1}, \quad (25)$$

and $P := P_{2K-1}$. Then, by denoting $\theta_n$ as:

$$\theta_n = P_n A_n^H h_{p,n}, \quad (26)$$

the intermediate estimate $\theta_n$ can imply the LS solution from first (n+1) pilot observations, eventually arriving at the true LS solution when $n = 2K-1$, i.e., $\theta_{2K-1} = \hat{\theta}$.

By using the well-known matrix inversion lemma for computation of matrix $P_n$ and after some matrix manipulations, the following recursive relations may be obtained:

$$P_n = P_{n-1} - \eta_n d_n d_n^H, \quad (27)$$

$$\theta_n = \theta_{n-1} + \eta_n d_n e_n, \text{ for } n = 0, \ldots, 2K-1 \quad (28)$$

where $$\eta_n := (1 + a_n^H P_{n-1} a_n)^{-1}, \quad (29)$$

$$d_n := P_{n-1} a_n, \text{ and} \quad (30)$$

$$e_n := h_{p,n} - a_n^H \theta_{n-1}. \quad (31)$$

Regarding the initialization of the recursion, it can be observed from equation (25) that the initial value of $P_{-1}$ cannot be defined since $A_{-1} = 0$. Thus, a commonly used approximation for regularization in the recursive least squares (RLS) algorithm may be adopted, i.e., $P_{-1} \approx \delta^{-1} I$ with $\delta \ll 1$. By applying this particular approximation, the inverse matrix $P_n$ may become:

$$P_n \approx (A_n^H A_n + \delta I)^{-1}, \quad (32)$$

and with very small value of parameter $\delta$ the regularized inverse solution given by equation (32) may approach the true inverse solution. As a result, initial values for the recursion may be set as:

$$\{\theta_{-1}, P_{-1}\} := \{0, \delta^{-1} I\}. \quad (33)$$

It can be noted that the recursive relations may be also utilized for the case when $2K < 3N_a$. Because of regularization, it can be shown using the matrix inversion lemma that both expressions in equation (21) may be equivalent.

The error rate performance of the FQ scheme may be further improved by incorporating to the LS procedure an estimate of the power profile of channel taps. The motivation for this idea is that the LS fitting model may project the observation vectors onto the selected basis vectors, and the improvement may be achieved by imposing a weighting function on the basis. In other words, a known fact that the channel taps with shorter delay generally have higher power and the channel taps with longer delay have lower power can be leveraged in the LS-based channel estimation.

The observation matrix A may be constructed with the weighted basis $F_p \cdot W$, instead of uniformly weighted basis $F_p$ as in equation (18), where W may be defined as a diagonal weighting matrix. It has been shown that the optimal weighting matrix may be a diagonal matrix whose non-zero elements represent the channel magnitude profile, i.e., $$W = \text{diag}\{[\sigma_{l_0}, \ldots, \sigma_{l_{N_a-1}}]^T\}, \quad (34)$$

where $\sigma_l^2$ denotes the variance of the lth channel tap. But, the channel power profile is typically unknown. However, it can be demonstrated by simulations that a precise knowledge of the channel power profile may not be required, and the proposed FQ channel estimation scheme may also work well with an approximate power profile of channel taps.

Exemplary Complexity Comparison

A computational complexity of the proposed Fourier-Quadratic (FQ) channel estimation scheme may depend to a large extent on the renewal period of the delay profile L because weighted Fourier basis vectors may need to be re-evaluated at these intervals. If the delay profile changes on every channel estimation attempt, then the channel estimation scheme may need every time to perform recursive steps from equation (27) to equation (31). However, for certain embodiments of the present disclosure, the delay profile may be invariant for a plurality of channel estimation attempts, since there are many, e.g., maximum of 60 channel estimation attempts within one OFDMA symbol, and the delay profile may be almost constant over one OFDMA frame comprising 50 OFDMA symbols. Therefore, the delay profile L may be invariant for M channel estimation attempts.

FIG. 5 illustrates a complexity comparison in terms of a number of complex multiplications for different channel estimation algorithms. By utilizing the invariance of the channel delay profile L, two algorithms may be presented. The first algorithm may feature a pre-calculating of $PA^H$ from equation (26), and it is referred to as Algorithm-I in FIG. 5. The other algorithm may be characterized by pre-calculating the matrix $P_n$ for all recursion indexes n, and it is referred to as Algorithm-II in FIG. 5. For both algorithms, the corresponding pre-calculation may be performed once in a frame, while the evaluation of the vector of channel parameters θ and the reconstruction of channel response $h^{(i)}$ may occur at every channel estimation attempt.

For the Algorithm-I, the pre-calculation of $PA^H$ may be performed by applying the fast recursion to obtain the matrix P following by the multiplication of matrices P and $A^H$. Then, the vector of channel parameters θ may be evaluated for every channel estimation attempt by a simple matrix-vector multiplication, as given by equation (26).

On the other hand, the Algorithm-II may be applied to reduce the computational complexity of pre-calculation by avoiding the matrix-matrix multiplication of matrices P and $A^H$. The Algorithm-II may calculate matrix $P_n$ for all indexes n and store associated quantities, e.g., $P_n$, $\eta_n$, $a_n$ and $d_n$. Then, only two steps of the recursion given by equation (28) and equation (31) may be required to evaluate the vector of channel parameters θ.

Computational complexities of the Algorithm-I and the Algorithm-II can be compared with the well-known channel estimation algorithm that employs the automatic tuning of "K channel parameters" (i.e., K-tuning parameters), which is one particular algorithm that implements the "Quad-all" channel estimation and it is labeled in FIG. 5 as "Auto-K Quad" algorithm. For the Auto-K Quad approach, $N_k$ denotes the size of the parameter vector θ to be estimated, and $N_r$ is the size of K-tuning parameters.

Computational complexities of three aforementioned channel estimation algorithms may be quantified in terms of the number of required complex multiplications for a specific simulation scenario labeled as Scenario-I, as illustrated in FIG. 5. For this particular scenario, it can be assumed the Vehicular B channel model where the number of active taps $N_a$=6, the channel estimation block is K=10 OFDMA symbols long, and $N_k$=6 and $N_r$=3 for the Auto-K Quad algorithm. The number of clusters of interest per symbol may be between a minimum of 12 and a maximum of 60, the number of OFDMA symbols per downlink frame may be equal to 30, and the number of channel estimation attempts for the constant channel delay period L may be between a minimum of M=36 and a maximum of M=180.

From the results shown in FIG. 5, it can be observed that, under the minimum and the maximum number of clusters per symbol, the proposed Algorithm-I may be about 3.6 and 3 times more computationally complex than the Auto-K Quad algorithm, respectively. It is also shown that, under considered Scenario-I, the Algorithm-I may be more efficient than the Algorithm-II in both computational complexity and storage requirements.

Exemplary Simulation Results

The standard channel models, such as Vehicular B, Vehicular A and Pedestrian B channels may be simulated under differing conditions. The Doppler spread can be set to either 0.5% or 5% of subcarrier spacing, which can be 10 kHz for this exemplary case. The simulated system parameters are: N=1024, CP=128, $N_C$=14, K=10 and the QPSK modulation may be applied at a transmitter. The regularization parameter δ from equations (32) and (33) may be equal to 0.1, unless otherwise noted. The channel coding may be utilized according to the half-rate non-binary Turbo codes with the block length of 120.

As it is discussed earlier, the optimal weights, given by the true power profile of channel taps, may be generally unavailable in practice. Even though the power profile may be estimated from the known preamble signal, the estimated result may be very noisy since it is based on a single realization of the fading channel, while, under certain fading channel conditions, the channel impulse response may vary from one symbol to another.

First, error rate performances of various weighting schemes can be evaluated, such as: an optimal weighting scheme, a uniform weighting scheme, a weighting scheme based on noisy channel power profile, and an exponential weighting scheme. The noisy channel power profile $\tilde{\sigma}_l^2$ may be artificially created by adding random offset $\Delta\sigma_l^2$ in decibel (dB) domain to the true power profile, i.e., $$\tilde{\sigma}_l^2 = \sigma_l^2 + \Delta\sigma_l^2 \text{ (in dB)}, \quad (35)$$

where $\Delta\sigma_l^2$ may be selected from a uniform distribution in the interval [−5, 5] dB (or intervals [−10, 10] dB and [−20, 20] dB for certain embodiments).

The exponential power profile may be constructed in such a way that the first channel tap has the variance of 0 dB, and the last channel tap has the variance of −40 dB, while the in-between channel taps may be exponentially decayed as a function of their distance from the origin. For the optimal weighting scheme, the true power profile may be utilized, while the regularization parameter δ may be optimized along the used signal-to-noise ratio (SNR) in order to provide the best possible error rate performance.

Figure 6:
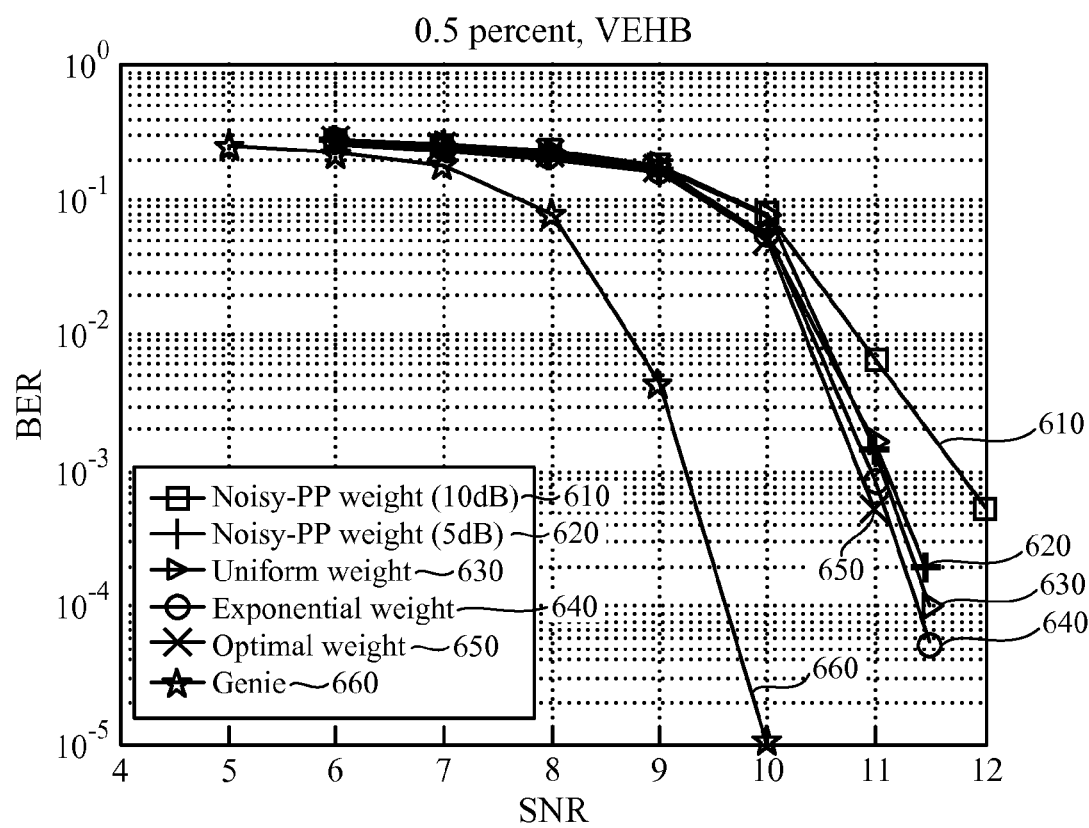
FIG. 6 illustrates exemplary bit-error rate (BER) performance results for different weighting schemes applied in the Fourier-Quad (FQ) channel estimation for Vehicular B channel with Doppler spread of 0.5% of subcarrier spacing.
Figure 7:
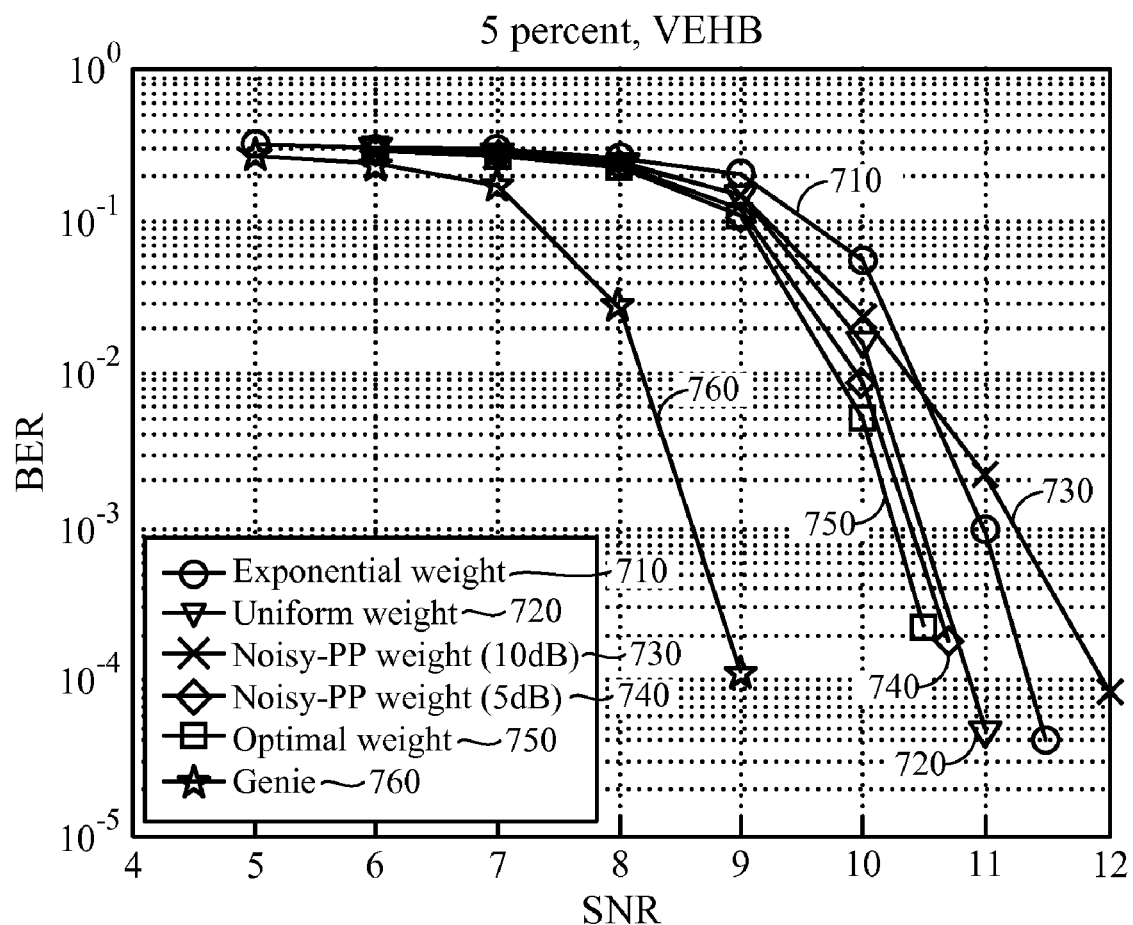
FIG. 7 illustrates exemplary BER performance results for different weighting schemes applied in the FQ channel estimation for Vehicular B channel with Doppler spread of 5% of subcarrier spacing.

FIG. 6 and FIG. 7 illustrate bit-error rate (BER) performance results for different weighting schemes applied in the FQ channel estimation for Vehicular B channel with Doppler spread of 0.5% and 5% of subcarrier spacing, respectively.

For the weighting scheme based on noisy power profile, random uniform offsets may be added on the true power profile, and the maximum offsets may amount to ±5 dB or ±10 dB (plots 610 and 620 in FIG. 6, and plots 730 and 740 in FIG. 7). It can be observed in FIG. 6 that for small Doppler frequency both exponential and uniform weighting schemes (i.e., plots 640 and 630, respectively) may perform very close to the optimal weighting scheme (i.e., plot 650), while it can be observed in FIG. 7 that for large Doppler frequency both exponential and uniform weighting schemes (i.e., plots 710 and 720, respectively) may widen the error rate performance gap to the optimal weighting scheme (i.e., plot 750), but still within a single dB unit of SNR.

Figure 8:
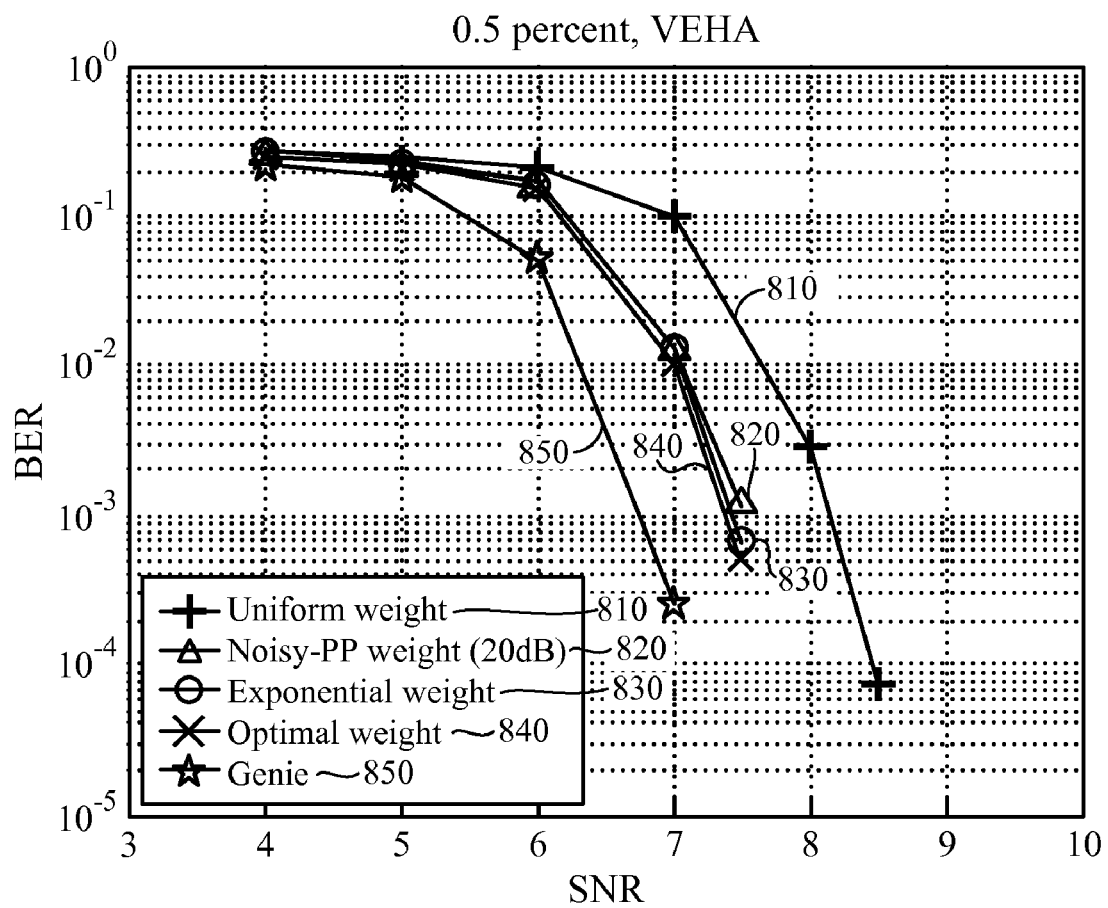
FIG. 8 illustrates exemplary BER performance results for different weighting schemes applied in the FQ channel estimation for Vehicular A channel with Doppler spread of 0.5% of subcarrier spacing.
Figure 9:
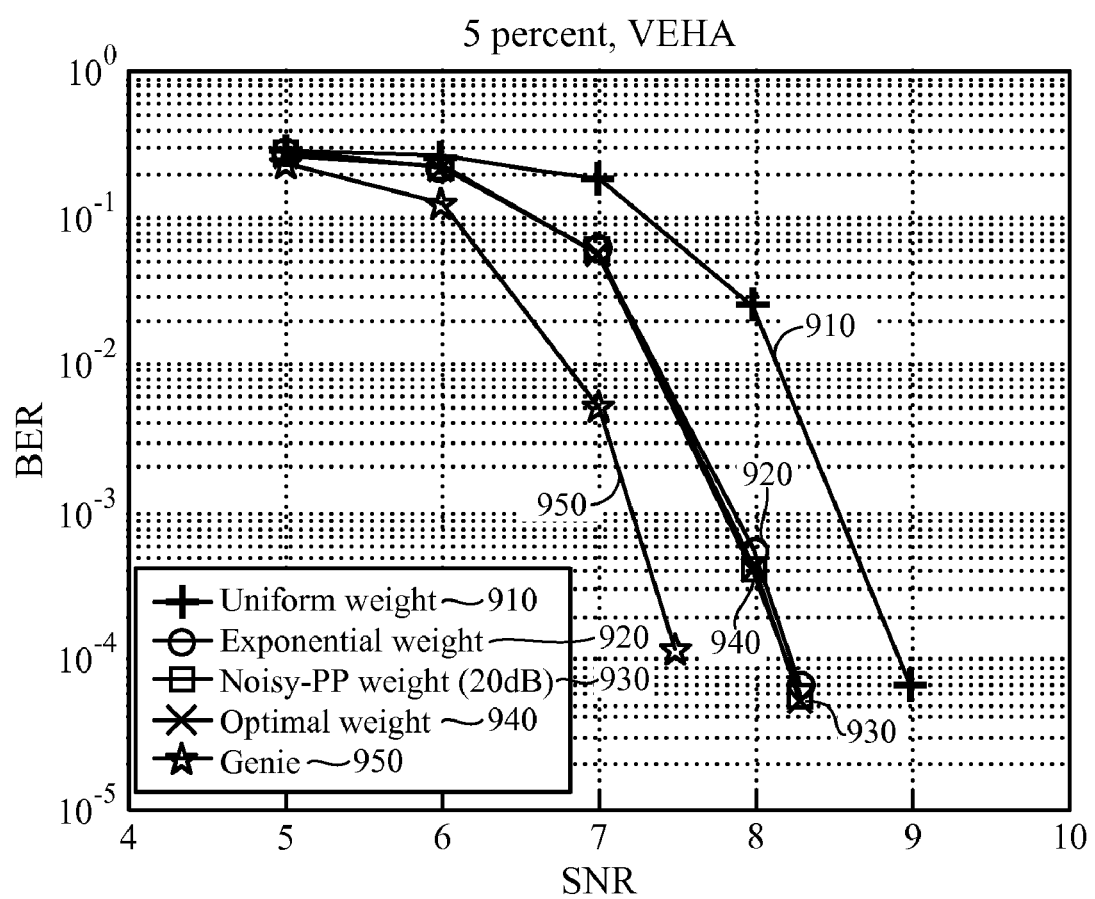
FIG. 9 illustrates exemplary BER performance results for different weighting schemes applied in the FQ channel estimation for Vehicular A channel with Doppler spread of 5% of subcarrier spacing.

FIG. 8 and FIG. 9 illustrate BER performance results for different weighting schemes applied in the FQ channel estimation for Vehicular A channel with Doppler spread of 0.5% and 5% of subcarrier spacing, respectively. For the weighting scheme based on noisy power profile, random uniform offsets may be added on the true power profile, and the maximum offsets may amount to ±20 dB (plots 820 and 930 in FIG. 8 and FIG. 9, respectively). For the Vehicular A channel model that has shorter delay spread than the Vehicular B channel, both the weighting scheme based on noisy power profile (i.e. plots 820 and 930 in FIG. 8 and FIG. 9, respectively) and the exponential weighting scheme (i.e., plots 830 and 920 in FIG. 8 and FIG. 9, respectively) perform very close to the optimal weighting scheme (plots 840 and 940 in FIG. 8 and FIG. 9, respectively), while outperforming the uniform weighting scheme (plots 810 and 910 in FIG. 8 and FIG. 9, respectively). It can be also observed that the noisy power profile is very robust for the error of up to ±20 dB (see plots 820 and 930 in FIG. 8 and FIG. 9, respectively).

The presented simulation results show that both the weighting scheme based on noisy power-profile with mild error (up to 5 dB) and the exponential weighting scheme may perform well, i.e., less than 1 dB from the optimal weighting scheme. Therefore, these two sub-optimal weighting techniques may be considered for the practical usage.

It can be also demonstrated by simulations that the proposed FQ channel estimation scheme may be robust to inaccuracies in the assumed channel delay profile. The erroneous tap locations $\tilde{l}_i$ may be defined as:

$$\tilde{l}_i = l_i + \Delta_i, \forall i \in \{0, \ldots, N_a - 1\}. \quad (36)$$

Following different tap-mismatch scenarios may be tested: each channel tap location mismatches by two samples, i.e., $\Delta_i = 2, \forall i \in \{0, \ldots, N_a - 1\}$, each channel tap location mismatches by three samples, i.e., $\Delta_i = 3, \forall i \in \{0, \ldots, N_a - 1\}$, each channel tap location mismatches by four samples, i.e., $\Delta_i = 4$, $\forall i \in \{0, \ldots, N_a - 1\}$, first two channel taps may be with random offset, i.e., $\Delta_i \in \{-4, -3, -2, -1, +1, +2, +3, +4\}$ for i=0,1 and $\Delta_i = 0$ for i=2, …, $N_a - 1$. The probability of occurrence for each possible offset value may be equal, i.e., $\Pr\{\Delta_i = -4\} = \ldots = \Pr\{\Delta_i = 4\}$.

Figure 10:
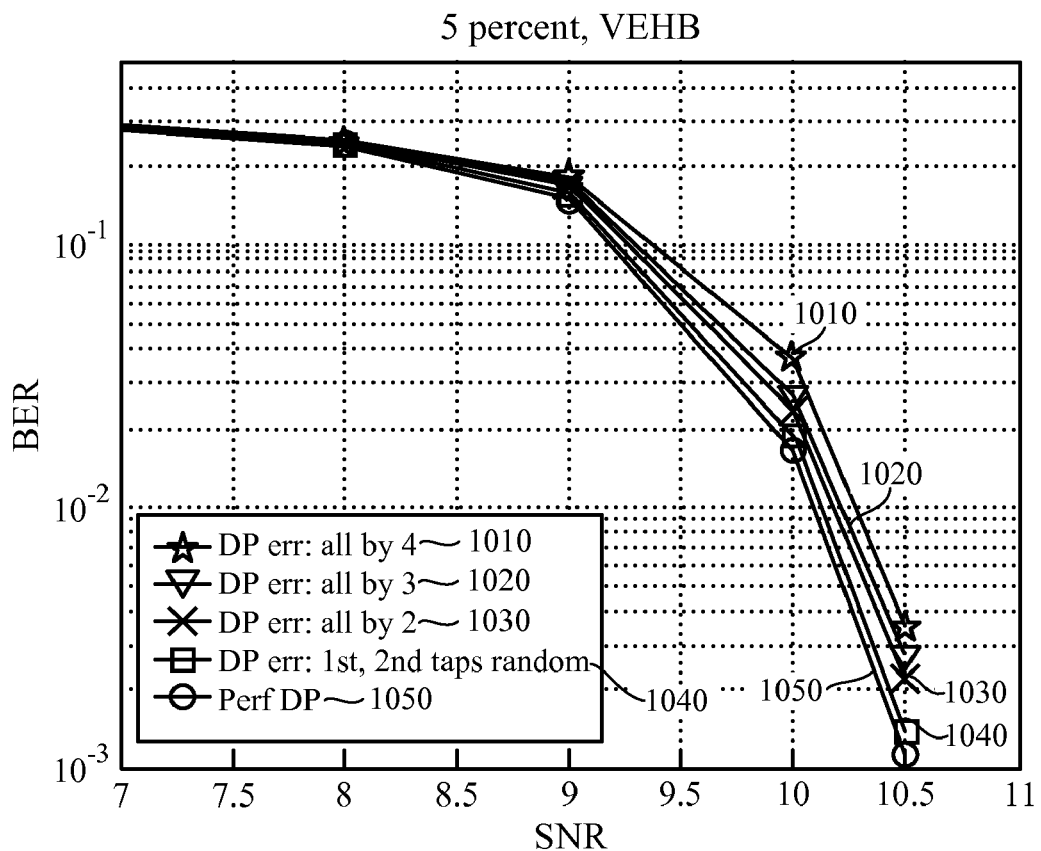
FIG. 10 illustrates exemplary BER performance results of the FQ channel estimation for various delay profiles in Vehicular B channel with Doppler spread of 5% of subcarrier spacing.

FIG. 10 illustrates BER performance results of the FQ channel estimation for various delay profiles in Vehicular B channel with Doppler spread of 5% of subcarrier spacing. The uniform weighting scheme may be also assumed. It can be observed that the performance degradation may be negligible for the random offset for first two channel taps (plot 1040), while the case where each channel tap mismatches by four samples (plot 1010) starts to have noticeable degradation. However, even with 3-samples mismatch (plot 1020), the BER performance loss to a perfectly known delay profile (i.e., plot 1050) may be as small as 0.16 dB.

Figure 11:
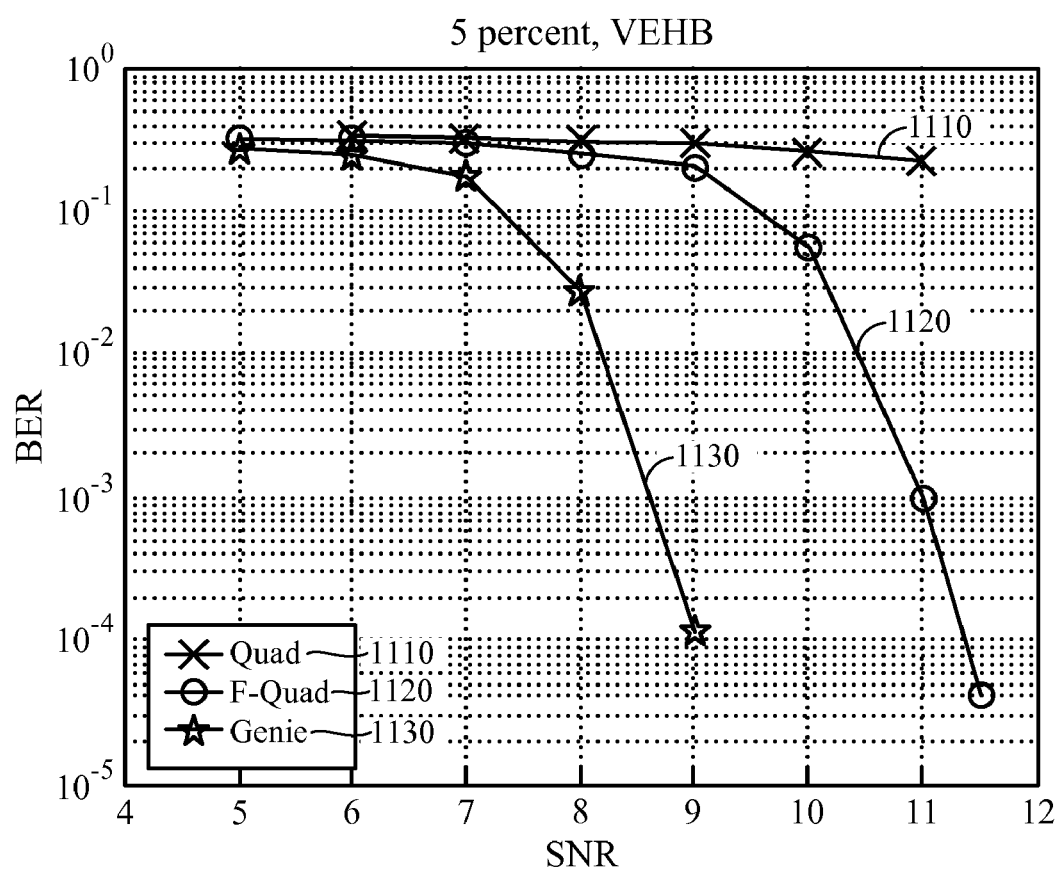
FIG. 11 illustrates exemplary BER performance of different channel estimation algorithms in Vehicular B channel with Doppler spread of 5% of subcarrier spacing.

FIG. 11 illustrates BER performance of different channel estimation algorithms in Vehicular B channel with Doppler spread of 5% of subcarrier spacing. First, in order to verify that the inter-symbol interference (ISI) for Vehicular B channel model may be negligible, the performance trace 1130 of the "genie" error rate performance bound is shown in FIG. 11. In this particular case, the time-averaged channel impulse response $g^{(i)}$ may be fully known. Thus, even with the perfect knowledge of $g^{(i)}$, there may exist ISI and inter-carrier-interference (ICI) induced by the channel variation within the OFDMA symbol. But, both of these impairments may be negligible since no error floor occurs on the plot 1130. Thus, it can be concluded that the ISI and the ICI may not severely affect the error rate performance in this particular channel scenario.

The proposed FQ scheme with the exponential weighting scheme (i.e., plot 1120) may be compared to the "genie" bound and the "Quad-all" scheme (i.e., plots 1130 and 1110, respectively). The performance trace 1110 of the Quad-all channel estimation algorithm shows very poor error rate performance due to its incapability to model highly rotating phase of the channel frequency response, whereas the error rate performance for the proposed FQ scheme with exponential weighting (plot 1120) may be dramatically improved.

Figure 12:
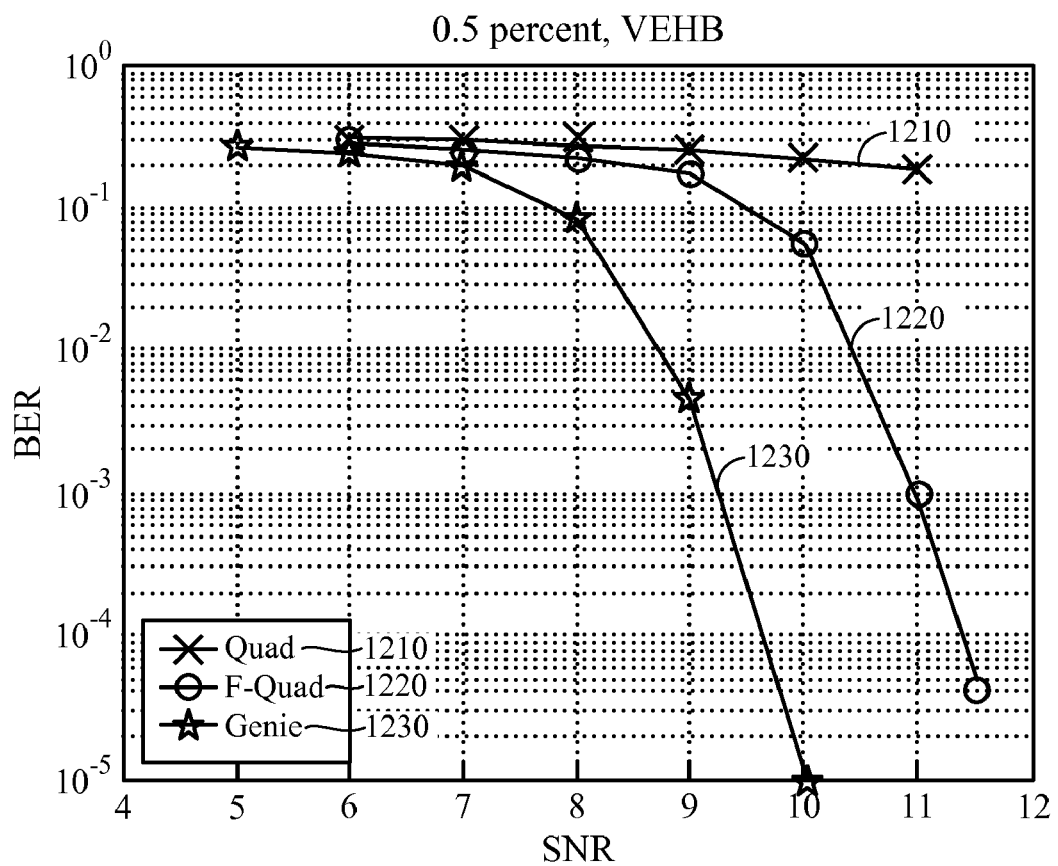
FIG. 12 illustrates exemplary BER performance of different channel estimation algorithms in Vehicular B channel with Doppler spread of 0.5% of subcarrier spacing.

FIG. 12 illustrates BER performance of different channel estimation algorithms in Vehicular B channel with Doppler spread of 0.5% of subcarrier spacing. With small Doppler frequency, the proposed FQ scheme (plot 1220) may perform as well as the high Doppler scenario shown in FIG. 11.

Figure 13:
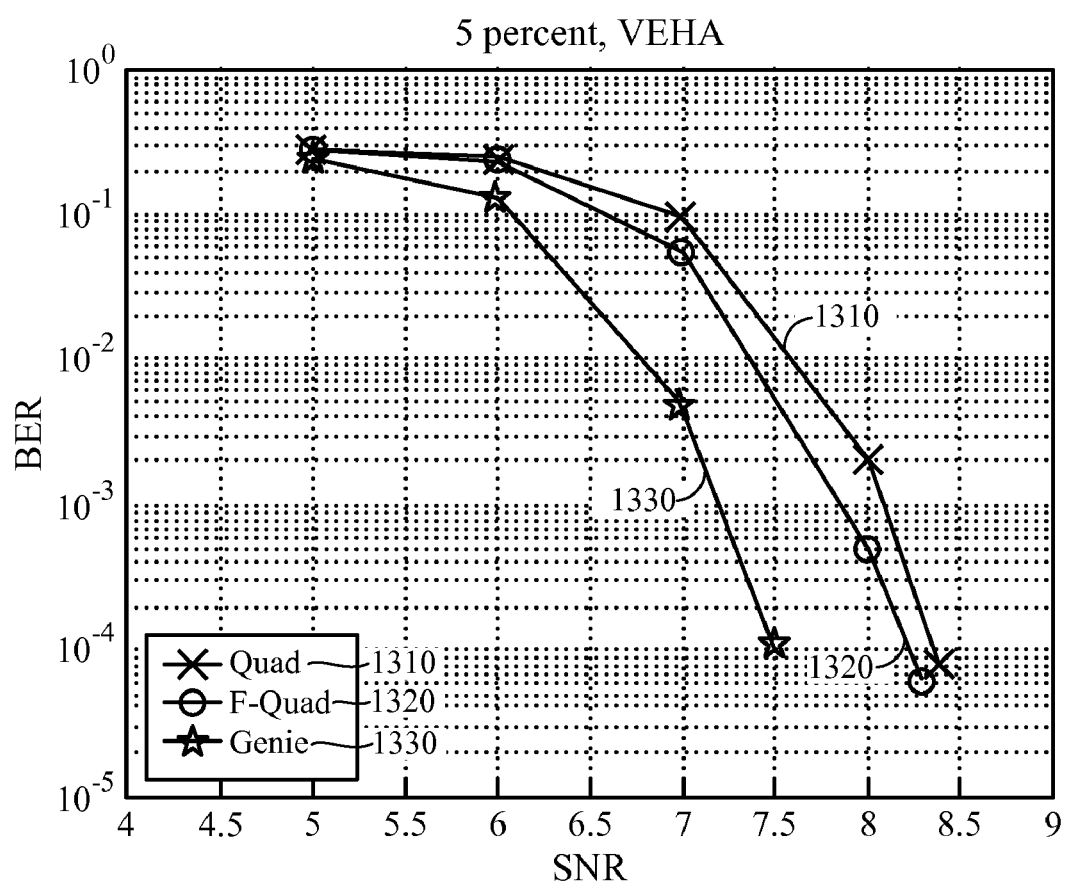
FIG. 13 illustrates exemplary BER performance of different channel estimation algorithms in Vehicular A channel with Doppler spread of 5% of subcarrier spacing.
Figure 14:
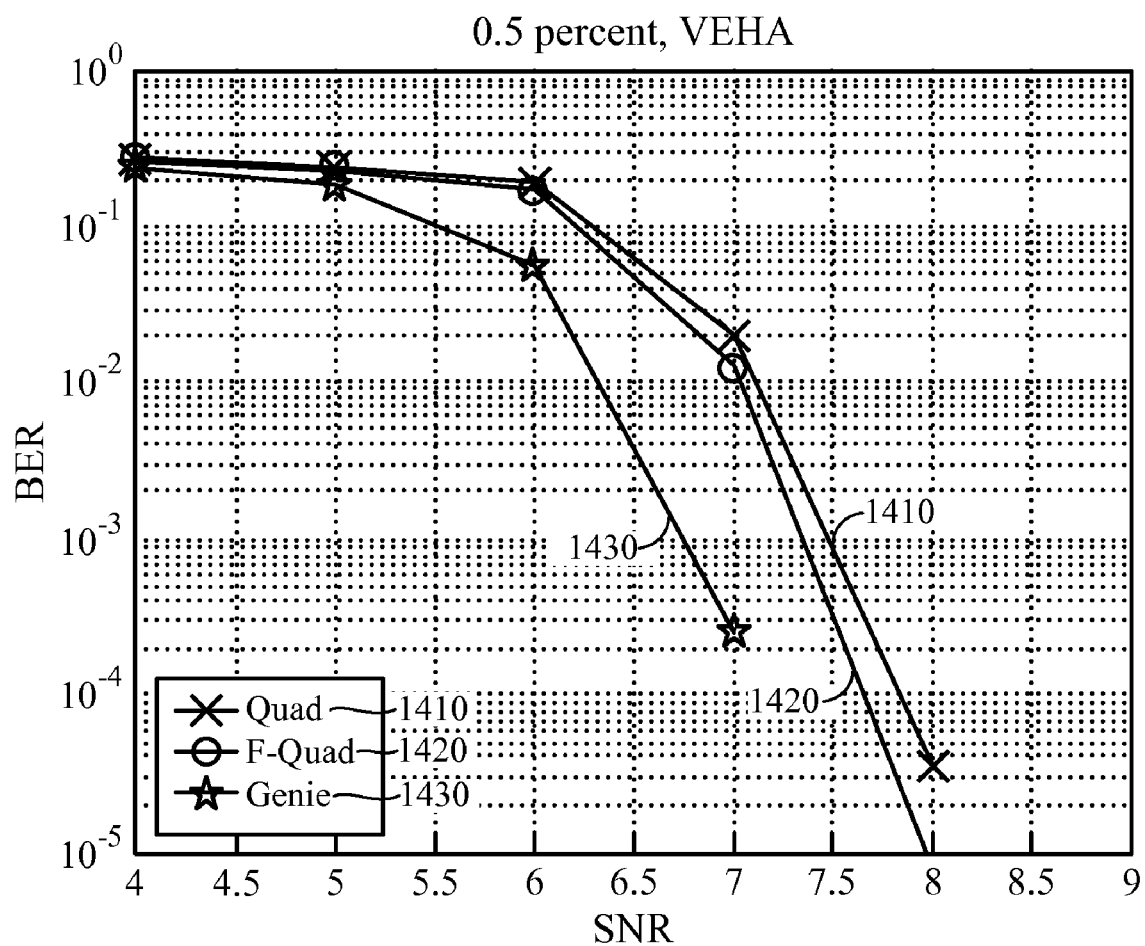
FIG. 14 illustrates exemplary BER performance of different channel estimation algorithms in Vehicular A channel with Doppler spread of 0.5% of subcarrier spacing.
Figure 15:
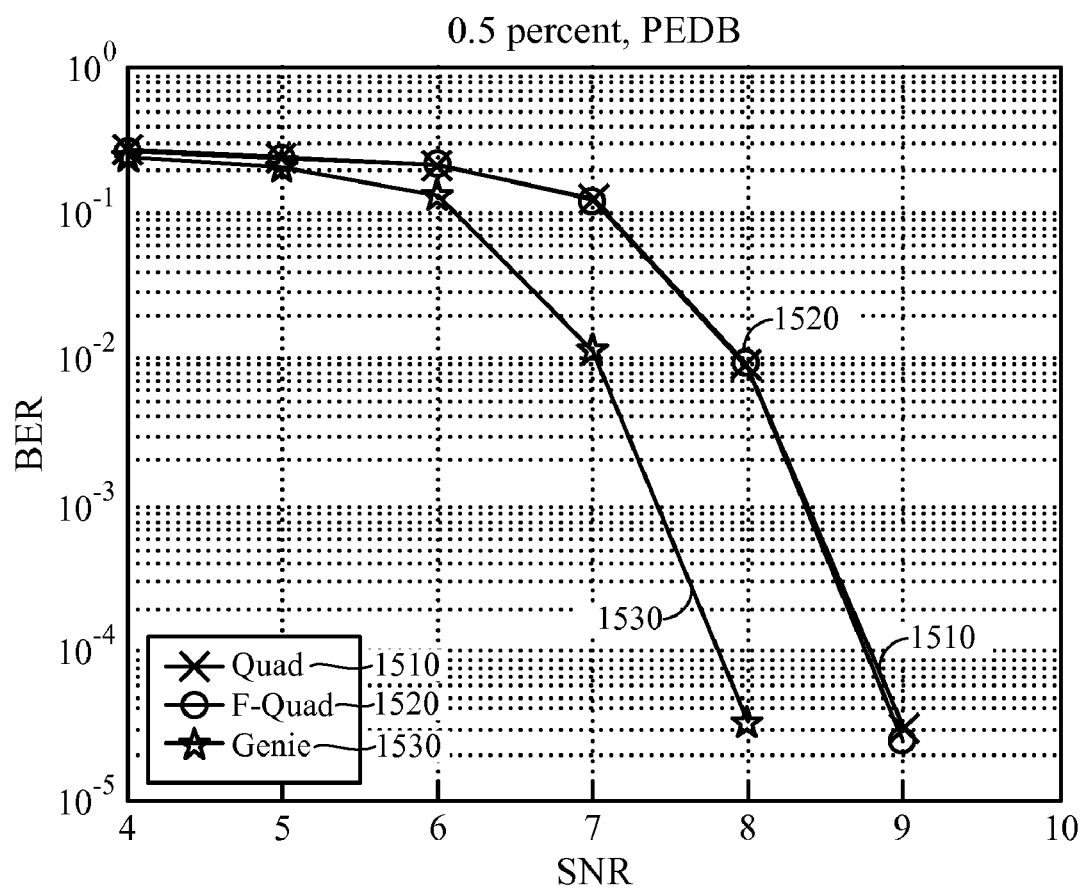
FIG. 15 illustrates exemplary BER performance of different channel estimation algorithms in Pedestrian B channel with Doppler spread of 0.5% of subcarrier spacing.

FIG. 13 and FIG. 14 illustrate BER performance of different channel estimation algorithms in Vehicular A channel with Doppler spread of 5% and 0.5% of subcarrier spacing, respectively. FIG. 15 illustrates BER performance of different channel estimation algorithms in Pedestrian B channel with Doppler spread of 0.5% of subcarrier spacing. It can be observed from FIG. 13 and FIG. 14 that the proposed FQ scheme (i.e., plots 1320 and 1420 in FIG. 13 and FIG. 14, respectively) may outperform the Quad-all scheme (i.e., plots 1310 and 1410 in FIG. 13 and FIG. 14, respectively) by about several fractions of dB of SNR, while it can be observed from FIG. 15 that the FQ scheme (i.e., plot 1520) and the Quad-all scheme (i.e., plot 1510) may display almost the same error rate performance because of a very small channel delay spread.

Exemplary Derivation of Fast Recursion

Using definitions given by equations (23) and (25), the following may be obtained:

$$P_n = (A_{n-1}^H A_{n-1} + a_n a_n^H)^{-1} \quad (37)$$
$$= (P_{n-1}^{-1} + a_n a_n^H)^{-1}.$$

According to the matrix inversion lemma, equation (37) may be represented as:

$$P_n = P_{n-1}^{-1} - P_{n-1} a_n (1 + a_n^H P_{n-1} a_n)^{-1} a_n^H P_{n-1}. \quad (38)$$

It can be now observed that equation (38) may be rewritten as equations (27), (29) and (30).

For the recursive computation of the channel parameter vector $\theta_n$, inclusion of equation (27) into equation (26) and the incremental-form replacements in equations (23)-(24) may yield:

$$\theta_n = (P_{n-1} - \eta_n d_n d_n^H)(A_{n-1}^H h_{p,n-1} + a_n h_{p,n}) \quad (39)$$
$$= \theta_{n-1} + d_n h_{p,n} - \eta_n d_n a_n^H \theta_{n-1} - \eta_n d_n a_n^H P_{n-1} a_n h_{p,n}. \quad (40)$$

By plugging:

$$a_n^H P_{n-1} a_n = \eta_n^{-1} - 1, \quad (41)$$

which may be derived from equation (29), into the last term in equation (40), equation (40) may be simplified to equation (28).

Exemplary Derivation of Optimal Weighting Matrix

If there is an access to the knowledge of channel statistics, such as channel power profile, the optimal Bayesian estimator (e.g., minimum mean-square-error (MMSE) estimator) can be applied. To simplify the problem, the optimal estimator may be derived only for the frequency response of the channel, without including the time variation. Only the variation in the frequency dimension may be considered due to the fact that the time variation requires the knowledge about channel time statistics, e.g., Doppler spectrum and Doppler frequency, which may complicate the problem. The system model for the pilot sub-channel within an OFDMA symbol may be expressed as $$y_p = \text{diag}\{p\} \cdot \underbrace{F_p \cdot g}_{h} + n, \quad (42)$$

where $y_p, p, h, n \in C^2$ are received signal vector for the pilot subcarriers, pilot signal, frequency response of the channel and Additive White Gaussian Noise (AWGN) vector with variance $\sigma^2$, respectively. Also, vector g represents an impulse response of the channel with Gaussian distribution, i.e. $g \sim N(0, R_g)$.

Since the channel power profile may be available, it follows that:

$$R_g = \text{diag}\{[\sigma_{l_0}^2, \ldots, \sigma_{l_{N_a-1}}^2]^T\}. \quad (43)$$

With $\text{diag}\{p\} = P \cdot I$ as in the WiMAX standards where P is a magnitude of the pilot signal, the MMSE estimate of the channel impulse response g may be given by:

$$g_{MMSE} = (P^2 F_p^H F_p + \sigma^2 R_g^{-1})^{-1} P F_p^H y \quad (44)$$

$$= R_g^{1/2} R_g^{-1/2} (P^2 F_p^H F_p + \sigma^2 R_g^{-1}) R_g^{-1/2} R_g^{1/2} P F_p^H y \quad (45)$$

$$= R_g^{1/2} \left( R_g^{1/2} F_p^H F_p R_g^{1/2} + \frac{\sigma^2}{P^2} I \right)^{-1} R_g^{1/2} F_p^H \frac{y}{P}. \quad (46)$$

Then, the frequency response of the channel may be reconstructed as:

$$\hat{h}_{MMSE} = F_C \cdot \hat{g}_{MMSE} \quad (47)$$

$$= F_C R_g^{1/2} \left( R_g^{1/2} F_p^H F_p R_g^{1/2} + \frac{\sigma^2}{P^2} I \right)^{-1} R_g^{1/2} F_p^H \frac{y}{P}. \quad (48)$$

The optimal estimate of channel response given by equation (48) may be compared with the regularized-LS estimate, which is a part of the proposed FQ scheme. The frequency response reconstructed by the weighted basis using regularization may be given as:

$$\hat{h}_{LS} = F_C \cdot W \cdot \hat{g}_{LS} \quad (49)$$

$$= F_C W (W^H F_p^H F_p W + \delta I)^{-1} W^H F_p^H h_p. \quad (50)$$

After relating equation (48) with equation (50), it can be derived that the optimal weighting matrix may be:

$$W = R_g^{1/2} \quad (51)$$

$$= \text{diag}\{[\sigma_{l_0}, \ldots, \sigma_{l_{N_a-1}}]^T\}, \quad (52)$$

with $\delta = \sigma^2/P$.

Figure 4A:
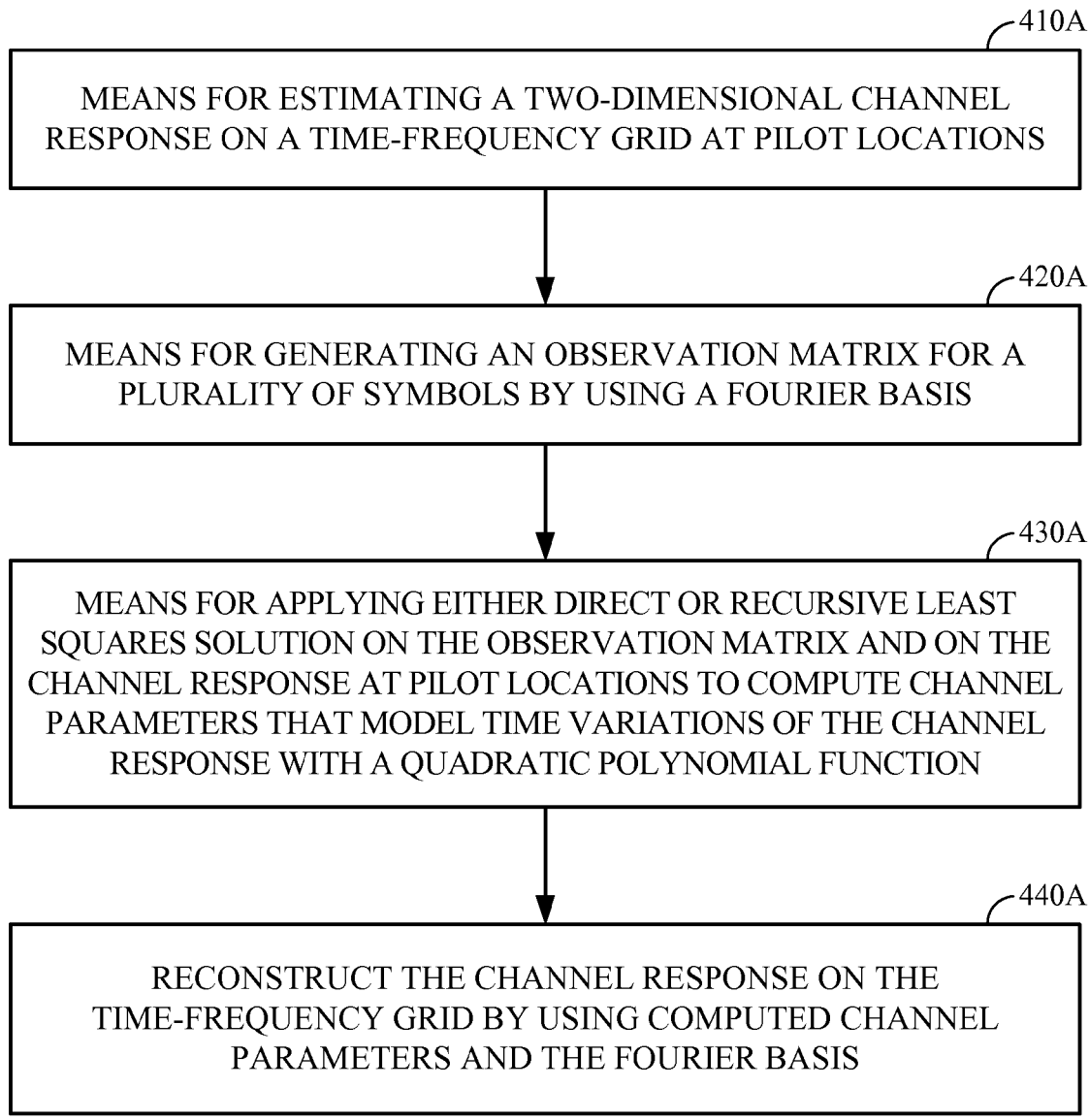
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, blocks 410-440 illustrated in FIG. 4 correspond to means-plus-function blocks 410A-440A illustrated in FIG. 4A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
    estimating a two-dimensional channel response at pilot locations on, a time-frequency grid;
    generating an observation matrix for a plurality of symbols by using a Fourier basis;
    computing channel parameters that model time variations of the channel response with a quadratic polynomial function using the observation matrix and the channel response; and
    reconstructing the channel response on the time-frequency grid at non-pilot locations using the computed channel parameters and the Fourier basis.

2. The method of claim 1, wherein computing the channel parameters comprises computing channel parameters based on the least squares solution.

3. The method of claim 2, further comprising:
    computing a temporary matrix based on the observation matrix; and
    wherein the least squares solution for channel parameters is obtained by direct inversion of the temporary matrix.

4. The method of claim 2, wherein the least squares solution for channel parameters is recursively computed.

5. The method of claim 1, further comprising:
    applying weight coefficients to the Fourier basis to generate a weighted observation matrix.

6. The method of claim 5, wherein the weight coefficients correspond to variances of channel taps.

7. The method of claim 5, wherein the weight coefficients are different from true variances of channel taps by offset values.

8. The method of claim 5, wherein the weight coefficients are uniformly distributed across channel taps.

9. The method of claim 5, wherein the weight coefficients are exponentially distributed across channel taps.

10. An apparatus for wireless communications, comprising:
    logic for estimating a two-dimensional channel response at pilot locations on a time-frequency grid;
    logic for generating an observation matrix for a plurality of symbols by using a Fourier basis;
    logic for computing channel parameters that model time variations of the channel response with a quadratic polynomial function using the observation matrix and the channel response; and
    logic for reconstructing the channel response on the time-frequency grid at non-pilot locations using the computed channel parameters and the Fourier basis.

11. The apparatus of claim 10, wherein the logic for computing the channel parameters comprises logic for computing channel parameters based on the least squares solution.

12. The apparatus of claim 11, further comprising:
    logic for computing a temporary matrix based on the observation matrix; and
    wherein the least squares solution for channel parameters is obtained by direct inversion of the temporary matrix.

13. The apparatus of claim 11, wherein the least squares solution for channel parameters is recursively computed.

14. The apparatus of claim 10, further comprising:
    logic for applying weight coefficients to the Fourier basis to generate a weighted observation matrix.

15. The apparatus of claim 14, wherein the weight coefficients correspond to variances of channel taps.

16. The apparatus of claim 14, wherein the weight coefficients are different from true variances of channel taps by offset values.

17. The apparatus of claim 14, wherein the weight coefficients are uniformly distributed across channel taps.

18. The apparatus of claim 14, wherein the weight coefficients are exponentially distributed across channel taps.

19. An apparatus for wireless communications, comprising:
    means for estimating a two-dimensional channel response at pilot locations on a time-frequency grid;
    means for generating an observation matrix for a plurality of symbols by using a Fourier basis;
    means for computing channel parameters that model time variations of the channel response with a quadratic polynomial function using the observation matrix and the channel response; and
    means for reconstructing the channel response on the time-frequency grid at non-pilot locations using the computed channel parameters and the Fourier basis.

20. The apparatus of claim 19, wherein the means for computing the channel parameters comprises means for computing channel parameters based on the least squares solution.

21. The apparatus of claim 20, further comprising:
means for computing a temporary matrix based on the observation matrix; and
wherein the least squares solution for channel parameters is obtained by direct inversion of the temporary matrix.

22. The apparatus of claim 20, wherein the least squares solution for channel parameters is recursively computed.

23. The apparatus of claim 19, further comprising:
means for applying weight coefficients to the Fourier basis to generate a weighted observation matrix.

24. The apparatus of claim 23, wherein the weight coefficients correspond to variances of channel taps.

25. The apparatus of claim 23, wherein the weight coefficients are different from true variances of channel taps by offset values.

26. The apparatus of claim 23, wherein the weight coefficients are uniformly distributed across channel taps.

27. The apparatus of claim 23, wherein the weight coefficients are exponentially distributed across channel taps.

28. A computer-program product for wireless communications, comprising a non-transitory computer readable medium having instructions stored thereon, the instructions being executable by one or more processors and the instructions comprising:
instructions for estimating a two-dimensional channel response at pilot locations on a time-frequency grid;
instructions for generating an observation matrix for a plurality of symbols by using a Fourier basis;
instructions for computing channel parameters that model time variations of the channel response with a quadratic polynomial function using the observation matrix and the channel response; and
instructions for reconstructing the channel response on the time-frequency grid at non-pilot locations using the computed channel parameters and the Fourier basis.

29. The computer-program product of claim 28, wherein, the instructions for computing the channel parameters comprise instructions for computing channel parameters based on the least squares solution.

30. The computer-program product of claim 29, wherein the instructions further comprise:
instructions for computing a temporary matrix based on the observation matrix; and
wherein the least squares solution for channel parameters is obtained by direct inversion of the temporary matrix.

31. The computer-program product of claim 29, wherein the least squares solution for channel parameters is recursively computed.

32. The computer-program product of claim 28, wherein the instructions further comprise:
instructions for applying weight coefficients to the Fourier basis to generate a weighted observation matrix.

33. The computer-program product of claim 32, wherein the weight coefficients correspond to variances of channel taps.

34. The computer-program product of claim 32, wherein the weight coefficients are different from true variances of channel taps by offset values.

35. The computer-program product of claim 32, wherein the weight coefficients are uniformly distributed across channel taps.

36. The computer-program product of claim 32, wherein the weight coefficients are exponentially distributed across channel taps.

* * * * *